June 18, 1929.   R. B. GOLDSCHMIDT ET AL   1,717,679
DIRECT READING RADIO TELEGRAPHIC COMPASS
Original Filed May 24, 1920   2 Sheets-Sheet 1
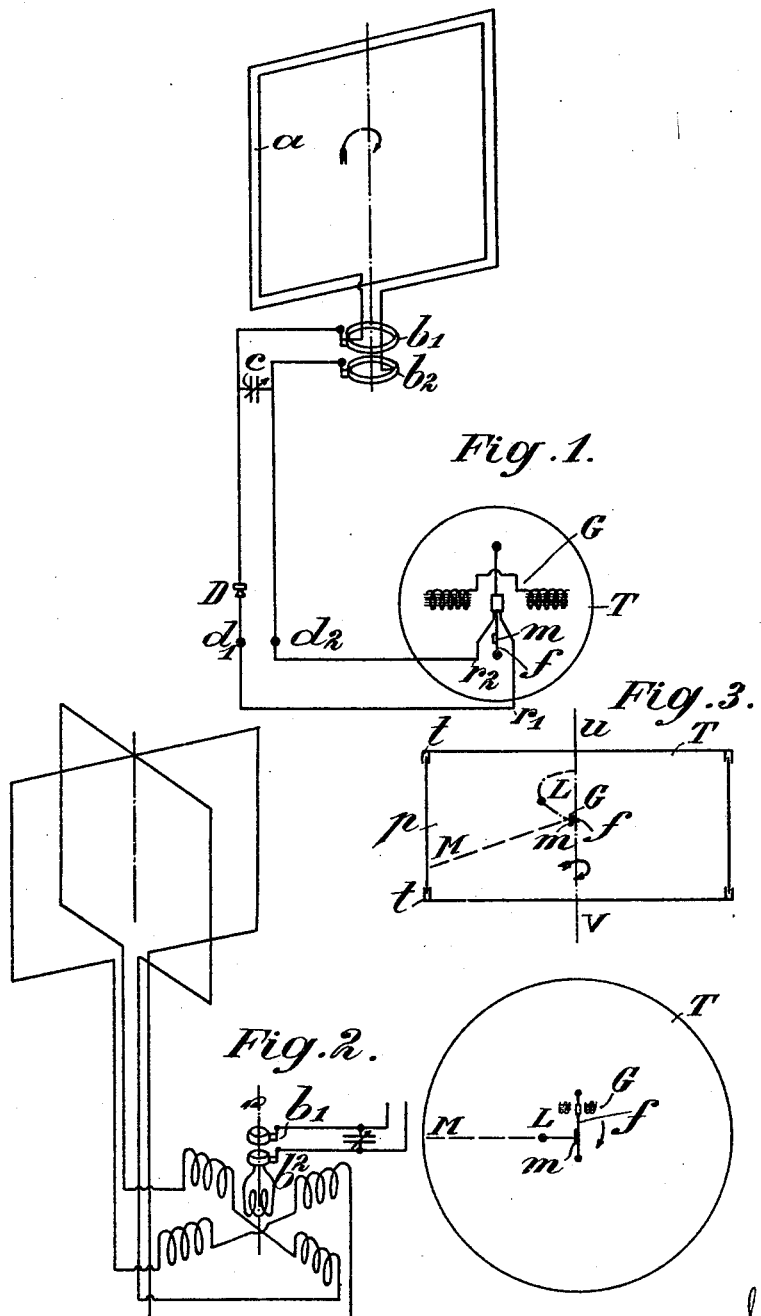

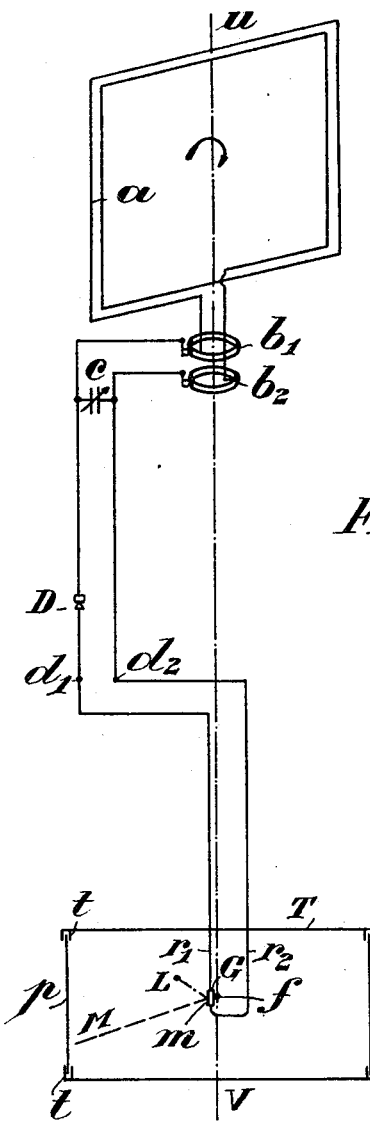

Patented June 18, 1929.

1,717,679

UNITED STATES PATENT OFFICE.

ROBERT BENEDICT GOLDSCHMIDT AND RAYMOND BRAILLARD, OF BRUSSELS, BELGIUM, ASSIGNORS TO RADIO CORPORATION OF AMERICA, A CORPORATION OF DELAWARE.

DIRECT-READING RADIO TELEGRAPHIC COMPASS.

Original application filed May 24, 1920, Serial No. 383,919, now Patent No. 1,525,177, dated February 3, 1925, and in Belgium May 21, 1919. Divided and this application filed January 3, 1925. Serial No. 403.

The present invention is a division of our U. S. Patent No. 1,525,177 patented February 3, 1925, on which application was filed May 24, 1920, Serial No. 383,919.

The method at present employed in radiogoniometry for the determination of the azimuth of a radio-telegraphic sending station, consist in the estimation by hearing of the maxima and the minima in the intensity of the signals received, when the position of the receiving system or one of its parts is varied.

For this purpose, either a frame carrying a certain number of turns of wire and which can be rotated about a vertical axle, is employed, or a pair of antennæ or of fixed frames, situated in two vertical planes perpendicular to each other and coupled inductively or electrically to a third circuit including a movable coil or a movable condenser plate.

In the two cases, the current produced in the frames or the antennæ is sent to a detector and after rectification into a telephone The operator manipulates by hand the movable frame or the movable coil or electrode of the third circuit and notes on a graduated scale the positions giving the maximum intensity or the two positions giving the extinction of the two sides of these maxima.

This operation is rather long and delicate and necessitates a relatively large amount of dexterity on the part of the operator.

It may be perceived besides that such a system, installed either on a ship, during bad weather, or on an aeroplane or dirigible, could not be used with all the rapidity and tranquility which would be necessary.

The device described below enables the measurement to be made instantaneously and automatically, and reduces the finding of the azimuth to a simple reading of a graduated circle.

In the accompanying drawings:

Fig. 1 is a diagrammatic perspective view of an apparatus constructed and arranged in accordance with this invention.

Fig. 2 is a diagrammatic perspective view of a modified form of the apparatus.

Fig. 3 is a detail vertical sectional view of the drum.

Fig. 4 is a detail horizontal sectional view of the same.

Fig. 5 is a diagram showing the means by which the frame and the movable galvanometer in the interior of the drum are coupled on the same axis.

Consider (Fig. 1) a frame, movable about a vertical axis. The current is collected by two contacts bearing on the rings $b_1$ $b_2$, connected to the tuning condenser $c$. D is a detector of a suitable type, such as of the crystal type as shown in the drawing, by means of which the high frequency oscillations are rectified and act on the galvanometer G. This detector may also be a magnetic detector, a thermionic valve with two electrodes or a thermionic valve with three electrodes of the audion type. The detector D furnishes at $d_1$ $d_2$ a rectified current whose amplitude is proportional to the intensity of the high frequency current generated in the frame and consequently to the desired azimuth.

To $d_1$ $d_2$ is connected a torsion galvanometer, the motions of the moving part of which are proportional to the rectified current and in consequence to the cosine of the above angle.

Without changing the character of the invention, it is possible to insert between $d_1$ $d_2$ and between $r_1$ and $r_2$ a thermionic amplifier of well known type for the purpose of increasing the intensity of the rectified current flowing through the relay R.

This galvanometer is placed at the center of a fixed graduated drum T, having, transparent walls, and operates as specified hereinafter. The axis of the galvanometer is situated on the extension of that of the frame, with which it is rigidly connected. For the clearness of the drawing, the galvanometer is shown as being independent of the frame.

In place of only one movable frame, two antennæ or fixed frames and perpendicular to each other may be used. In this case, the galvanometer is connected, through the detector, to the movable coil of the third coil, as shown in Figure 2, and is mounted on the same axis as the movable coil (for the clearness of the drawing, the galvanometer is shown as being independent of this coil).

This solution will be applicable more particularly to the installation made on board aeroplanes, dirigibles, or ships. The only moving part of the system will then include only the coil or movable electrode and the galvanometer mounted on the same shaft. This device is consequently very easy to handle and occupies little space.

The device described above necessitates, on the part of the operator, a very simple operation which will be described below, and which consists in utilizing a ray of light describing a sinusoidal curve on the drum T.

Consider (Fig. 3) a drum T consisting of a metallic frame $t, t$, supporting a cylindrical transparent wall $p$, of ground glass or mica, for example.

The drum T is stationary and carries a graduation in degrees, of which the origin is determined.

At the center of the drum, is placed a torsion galvanometer G, mounted on a journal $u\ v$ situated in the axle of the drum and turning either with the shaft of the coil or of the movable electrode of the third circuit, in the case of the use of the two perpendicular frames.

The wire $f$ of the galvanometer is perpendicular to the shaft $u\ v$. It carries a small mirror $m$ parallel to the shaft $u\ v$ and placed on this shaft.

Fig. 5 is a view showing the manner in which the frame and the movable galvanometer in the interior of the drum are coupled on the same axis. In the case where two fixed frames in place of a single movable frame are used, it is the movable finder coil that is connected in the galvanometer on the same axis.

The galvanometer is supplied with the rectified current coming from the detector. Its angle of torsion is therefore proportional to the cosine of the angle $\alpha$ which we have mentioned above.

Let L represent a luminous source reduced to a point and being in the plane passing through $u\ v$ and perpendicular to the galvanometer wire. This source is stationary relatively to the galvanometer and will rotate, at the same rate as the latter, about the shaft $u\ v$.

The ray of light coming from L is reflected by the mirror and forms at M a luminous spot on the drum, a spot which may be seen from the exterior of the drum on account of the transparence of the wall.

If the shaft $u\ v$ is made to turn at the same rate as the receiving frame, or as the coil or movable electrode in the case of two stationary frames, the spot of light on the drum will be given on the one hand a circular motion, and on the other hand a vertical motion, its vertical elongation being proportional to the angle of torsion of the galvanometer.

The spot of light will therefore trace on the drum a luminous curve of sinusoidal shape, the two maxima of which will correspond to the positions of the movable frame in the plane of the required azimuth.

If the frame and the galvanometer turn at a rate of at least ten revolutions per second, the curve traced will appear permanent, as long as the waves are sent, by reason of the persistence of luminous impressions on the retina of the eye.

It will be sufficient to compare the position of the maxima of the curve traced with the origin of the graduations in order to read instantly, without any further manipulation, the azimuth of the sending station, in relation to the fixed known direction.

If the waves transmitted by the sending station are in the form of Morse signals instead of a continuous line, the curve will appear discontinuous, at least unless the rate of rotation be high enough to give it a continuous aspect. In any case, it will be easy to determine the position of the maxima.

The above apparatus can be combined with a magnetic compass so as to note the azimuth of the station being looked for in relation to the meridian, for example.

In order to accomplish this, the graduation of the drum T will be made movable, so that the zero of this graduation may be brought opposite to the position of the magnetic needle, the latter having its pivot coinciding with the axis of the radio-telegraphic compass.

The direction of the sending station in relation to the meridian would thus be obtained, no matter what the position of the direction of the ship or the aeroplane might be.

What we claim is:

1. In combination with a radiogoniometric receiver system, comprising two perpendicular loop antennæ coupled with a rotating loop closed electrically by a capacity, a system for recording directly the direction of a radio-telegraphic emitting station comprising a mirror galvanometer actuated by the current furnished by the rotating loop after rectification, said galvanometer being arranged at the center of a cylindrical member, the galvanometer structure being arranged on the axis of said rotatable loop and movable with the same so that light reflected from the mirror of said mirror galvanometer describes on said cylindrical member a curve corresponding to the variations of the rectified current.

2. In combination, a directional antenna means for producing an effect according to the direction of propogation of signals impinging on the antenna, means for moving said directional means to produce an indication according to the effective directional intensity of said signals, said directional means being associated with the antenna and comprising a rectifier and a reflecting galvanometer.

3. In a device of the character described, a rotatable loop adapted to have radio frequency currents set up therein, means for causing currents set up in the loop to operate apparatus adapted to be rotated by the rotation of said loop, and means comprising a light reflector for indicating the current operation of said rotatable apparatus.

4. In a device of the character described, a rotatable loop adapted to have radio frequency currents set up therein, means for causing currents so set up to actuate apparatus responsive to the strength of currents applied to it, and means comprising a light reflector for indicating the operation of said current responsive apparatus.

5. In a device of the character described, a rotatable loop adapted to have currents of radio frequencies set up therein, a reflecting galvanometer adapted to be rotated by rotation of said loop, and means for showing the path of a beam of light reflected from said galvanometer due to the combined mechanical rotation and electrical actuation of said reflecting galvanometer.

6. In apparatus of the character described, a rotatable loop adapted to have currents of radio frequencies set up therein, means responsive to the strength of the currents so set up, and means, comprising a source of light and a reflector, for indicating the response of the current responsive means to the currents set up.

7. In a device of the character described, a pair of loops substantially at right angles to each other, a tuned rotatable loop within said pair of loops adapted to have currents of radio frequencies set up therein, a current responsive device adapted to be rotated by said rotatable loop and means for indicating the actuation of said current responsive device when actuated by currents set up in said loop.

In witness whereof we affix our signatures.

ROBERT BENEDICT GOLDSCHMIDT.
RAYMOND BRAILLARD.